United States Patent [19]

Goings

[11] Patent Number: 4,628,235
[45] Date of Patent: Dec. 9, 1986

[54] CONTROL CIRCUIT FOR MOTOR DRIVER

[75] Inventor: James R. Goings, Troy, Mich.

[73] Assignee: Gulf & Western Manufacturing Company, Southfield, Mich.

[21] Appl. No.: 777,747

[22] Filed: Sep. 19, 1985

[51] Int. Cl.$^4$ ............................................. H02P 1/04
[52] U.S. Cl. ................................... 318/430; 318/434; 363/19; 363/124; 363/49
[58] Field of Search ............... 318/430, 431, 434, 471, 318/472; 363/49, 19, 124; 323/265, 270, 271

[56] References Cited

U.S. PATENT DOCUMENTS

| | | | |
|---|---|---|---|
| 3,242,475 | 3/1966 | Davis | 318/490 X |
| 3,942,111 | 3/1976 | Pfouts | 318/490 X |
| 3,955,130 | 5/1976 | Graf | 318/434 X |
| 4,195,254 | 3/1980 | Gurwicz et al. | 318/434 X |
| 4,359,679 | 11/1982 | Regan | 363/49 X |

FOREIGN PATENT DOCUMENTS

| | | | |
|---|---|---|---|
| 52-26412 | 2/1911 | Japan | 318/490 |
| 54-126922 | 10/1979 | Japan | 363/49 |
| 55-83489 | 6/1980 | Japan | 318/430 |
| 56-83289 | 7/1981 | Japan | 318/490 |
| 56-83296 | 7/1981 | Japan | 318/490 |
| 56-153995 | 11/1981 | Japan | 318/472 |
| 56-153996 | 11/1981 | Japan | 318/472 |
| 58-08325 | 1/1983 | Japan | 363/49 |
| 0943673 | 7/1982 | U.S.S.R. | 363/49 |

Primary Examiner—William M. Shoop, Jr.
Assistant Examiner—Bentsu Ro
Attorney, Agent, or Firm—Body, Vickers & Daniels

[57] ABSTRACT

A control circuit is provided for operating a power switch with an associated resistance, wherein the power switch has conductive and nonconductive conditions and is adapted to apply a driving voltage across an electric load circuit, such as a D.C. motor, when the power switch is in its conductive condition. The control circuit of the disclosure includes a first voltage divider across the power switch and associated resistor for creating a variable monitored signal corresponding to the generally instantaneous voltage across the power switch and its associated resistance, a second voltage divider for creating a fixed reference signal, a comparator for creating a control signal having a preselected electrical characteristic, such as digital logic, when the monitored signal of the power switch has a given relationship, such as a lesser value, with respect to the reference signal, an output of the comparator for shifting the power switch from the conductive condition to the nonconductive condition upon creation of this control signal or digital logic and an oscillator for periodically creating an energizing signal shifting the power switch into its conductive condition when it is in the nonconductive condition whereby the power switch will be activated and deactivated at a variable pulse width. This prevents high current damage to the motor being driven by the power switch or the power switch itself.

30 Claims, 11 Drawing Figures

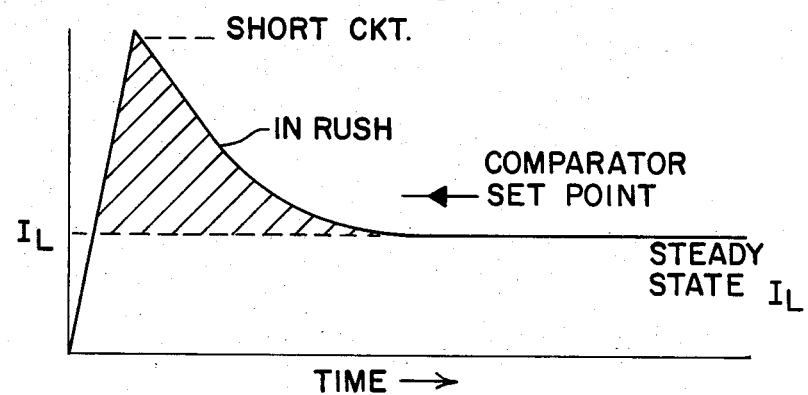
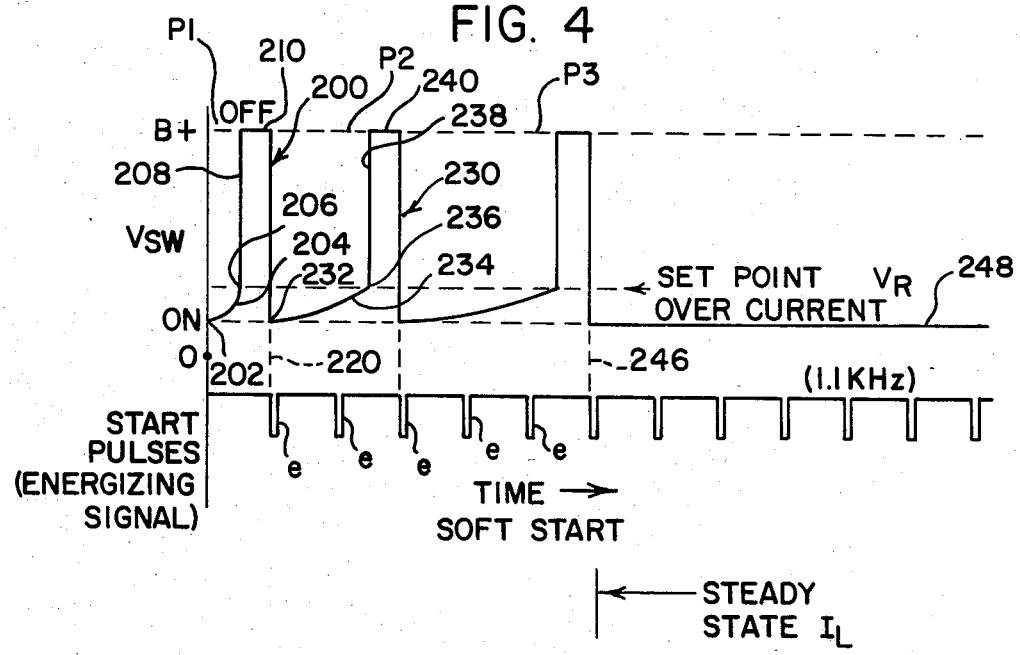

CONTROL CIRCUIT FOR MOTOR DRIVER

Disclosure

The present invention relates to the art of a driver circuit for a motor, such as the fan motor in a motor vehicle, and more particularly to an improved control circuit for operating the power switch used in the motor driver circuit.

The invention is particularly applicable for operation of the D.C. motor employed to cool the radiator of a motor vehicle or the blower motor for the air conditioning system of a motor vehicle and it will be described with particular reference thereto; however, the invention has much broader applications and may be employed for controlling any power switch used for operating a D.C. electrical load, especially when the load is used in a high production miniaturized application, such as a motor vehicle motor circuit. The power switch can be a MOSFET (hereinafter referred to as FET to include any such field effect transistor), mechanical relay or transistor, to name the most common miniaturized, mass production power switches. The D.C. electrical load is, in the preferred embodiment, the D.C. motor used for a fan or blower of a motor vehicle; however, the load may be the light circuit or circuits for a motor vehicle, or other electrical loads to be driven by a small power switch, such as a FET. The invention relates to the protection of the load from damage, protection of the switch means from damage caused by high current or high temperature, and detecting certain fault conditions existing at the load or detrimental high temperature conditions adjacent the power switch.

BACKGROUND OF INVENTION

In recent years, many motor vehicles have been designed in a manner that the drive shaft of the internal combustion engine can not be used to drive the cooling fan necessary for directing a convection air current through the radiator, which air current is needed, especially when driving at slow speed in hot weather. With the advent of front wheel drive vehicles having transverse engines and limited air intake openings, many motor vehicles are now being manufactured with one or more electrical motors driving fans for cooling the radiators. These fans may be operated only when the radiator coolant temperature or other operating parameters indicate a need for additional external cooling, as often determined by an onboard computer. Consequently, the cooling fan may be turned on only when the vehicle is stopped or operated in heavy traffic. These cooling fans may not be used for long periods, such as during the depths of the winter in certain locations. Even such diverse times as the fans are used, they must operate on demand. Otherwise, damage to the engine can result or the engine must be stopped immediately. Even though these fans are extremely critical, most automobile operators are unaware of their existence or their operation. Thus, they must be extremely reliable.

To operate the cooling fans as described above, it is standard practice to provide a driver circuit with some type of power switch or power relay, which driver circuit generally includes a printed circuit board having circuits for controlling the power switch in response to a demand signal from the vehicle. This demand signal can be a pulse width modulated, high frequency signal wherein the duty cycle determines the demand for one or more cooling fans to meet the cooling requirement of the engine. The power switch and associated printed circuit board containing the driver circuit for one or more motors are relatively small and must be inexpensive, since they are required by the millions in the automobile industry. These driver circuits must be monitored to prevent damage to the motor and the power switch itself by high currents, which currents can occur when the motor is stalled or shorted.

A substantial amount of effort has been devoted to controlling these motor driver circuits with miniaturized components so that these circuits and components can be mass produced at low cost and still assure that the relatively expensive motors are not damaged, irrespective of the load condition across the motors. The most successful of these prior miniaturized circuits is a control circuit for the motor driver circuit, which control circuit applies a low level testing current across the motor and through the driver circuit to determine the condition of the motor or electrical load. If the testing circuit senses a high current condition, the main power is not applied to the motor circuit. If there is no high current condition, then the main power switch is actuated to drive the motor at a speed, determined by the duty cycle of the applied power, generally this is full power. This prior circuit is quite successful, is low in cost and has proven to be useful for the intended purposes; however, this prior circuit does have some characteristics which add to its cost, even though the cost has heretofore been acceptable. One of the characteristics is that after the motor driver circuit has been initiated, a separate and distinct circuit must be employed for monitoring for high current flow through the motor. When this separate circuit detects a high current flow, the driver switch is deactivated. The need for a separate and distinct circuit used in combination with the control circuit increased the cost of the miniaturized unit. Further, a mechanical relay was often used. When the motor was turned on, there was an in-rush of current which could trip or actuate the current sensor. In some instances, the current sensor measured the voltage across the power switch and deactivated the driver circuit when this voltage exceeded a certain level indicating a high current flow. This type of current sensor of the prior device, as well as a current sensor utilizing a coil associated with a reed switch, must be calibrated so that it does not deactivate the motor driver during the in-rush of current at the start. This increases the set point for current protection. This conflict in current calibration has been somewhat overcome by the use of a current sensor in combination with a low level testing current. In this manner, the in-rush current levels are reduced during the testing of the motor circuit. Irrespective of the combination of various circuits, the concept of measuring current flow through the motor by various arrangements is not totally satisfactory. They usually deactivate the motor driver without providing an integrated restart feature. In a general summary, the prior devices involved a level of current sensed high enough to assure ability of starting the motor without tripping. Consequently, the current sensing capacity of the prior control circuits, during normal operation, was at the higher adjusted current level. This caused a delay in the sensing of high current flow which could cause damage to the motor driver circuit.

If the prior control circuits for the motor driver circuits of a motor vehicle fan system allows high current flow, the motor can be damaged before the sensing circuit is activated. This dilemma is not solved completely by combining a system using low level testing current. The motor or driver circuit can still be damaged when there is a direct short or stall in the motor. All these prior systems have involved some time delay drop out which, in some instances, is not fast enough to protect the motor or driver circuit.

The Invention

The present invention relates to an improved control circuit for the miniaturized driver circuit of the type used in driving a D.C. motor for operating the cooling fan or fans of a motor vehicle, which control circuit overcomes the difficulties mentioned above, without increasing the cost or complexity of the miniaturized control circuit. In accordance with this invention, the control circuit provides a self-induced pulse modulating feature, so that the current flow through the motor is limited to preselected values irrespective of the condition of the motor load. This circuit applies full power across the driver circuit and the motor load so that there is no need for a secondary low current testing circuit which was previously used. Such use of a low level secondary current for testing the motor circuit preparatory to applying full power is disclosed in prior application Ser. No. 718,722 filed on Mar. 28, 1985. The present invention takes the place of this prior system and allows full power to be applied to the driver circuit with self-induced pulse width modulation as over-current protection. There is no need for the testing circuit in combination with a current sensor, as shown in the prior patent application.

In accordance with the present invention, there is provided a control circuit for operating a power switch, such as a FET with an associated resistance. In the preferred embodiment, the associated resistance is the internal resistance between the drain and the source of the FET. This power switch or FET has nonconductive and conductive conditions and is adapted to apply a full driving voltage across an electrical load circuit, such as a D.C. motor, when the power switch or FET is in its conductive condition. This new control circuit, in accordance with the invention, includes means for creating a variable monitored signal, corresponding to the generally instantaneous voltage across the power switch or FET and its associated resistance. The level or value of this voltage is controlled by the current flow through the load and the resistance of the FET and/or its associated resistance. In this manner, high current will cause the monitored signal to increase by sensing a high voltage across the FET. Increased temperature of the FET will cause the associated resistance to increase which will be sensed as an increased value of the variable monitored signal. Consequently, high current and/or high temperature will cause a high monitored signal. The invention also includes means for creating a fixed reference signal to which the monitored signal is compared. A control signal is created, having a preselected electrical characteristic or D.C. logic, when the monitored signal has a given relationship, in practice greater than the reference signal. This control signal creating arrangement, in the preferred embodiment, is a comparator with a reference voltage being continuously compared with the voltage across the FET and its associated resistance. As the sensed voltage increases above the reference signal, a control signal is created by the comparator. This control signal is then used by a first shifting means for shifting the power switch from a conductive condition to the nonconductive condition upon the existence of the control signal or D.C. logic. In this fashion, when the monitored signal, indicative of the load conditions, exceeds the reference signal, the FET is turned off.

In accordance with the invention, there is a second condition shifting means or circuit for periodically creating an energizing signal to shift the power switch into its conductive condition, when it is in its nonconductive condition. This second circuit or means, in the preferred embodiment, is a series of spaced pulses which will turn the FET on if it is not already on. Thus, the sensed voltage will turn the FET off and the energizing pulse will then turn it back on. If high current conditions continue, the measured or sensed voltage across the FET will again remove the operating signal from the gate of the FET and turn the driver circuit off. This action of turning the FET off is substantially instantaneous so that the FET is deactivated at a low level by increased current to prevent damage to the FET or the electrical load being driven, i.e. a D.C. motor.

In accordance with still a further aspect of the invention, the control circuit is allowed to be active only when there is a demand for operation of the D.C. motor. This can be accomplished by maintaining a control signal logic on the gate of the FET until the on-board computer of the motor vehicle determines that this particular D.C. motor is to be operated. At that time, the control circuit is allowed to operate in the monitoring mode of the invention, as described above.

In accordance with another aspect of the present invention, there is provided a method of operating a power switch with an associated resistance of the type mentioned above. In accordance with this method, the power switch is rendered conductive, the voltage across the power switch is measured and the power switch is shifted to the nonconductive condition whenever the measured voltage exceeds a selected value. In accordance with this new method, a series of energizing pulses are created at a low duty cycle and high frequency to render the power switch conductive when it is nonconductive. In this manner, a high current condition turns the power switch off and the energizing pulse periodically turns the power switch on. This on and off operation of the power switch, in accordance with this new method causes self-modulation of the pulse width. The pulse width is the time of full power application to the motor circuit by conduction of the power switch. As the load current increases, the power switch is on for a shorter period of time. This pulse width modulation reduces the duty cycle of operation of the driver circuit itself. If the current does not increase to a set overload or over-current value, the power is maintained continuously and the circuit operates the load at full power with the energizing pulses that are periodically created having no effect, since the power switch is already in the conductive condition.

The primary object of the present invention is the provision of a control circuit for the driver circuit of an electric load, such as a D.C. motor, which control circuit is capable of being miniaturized and limits the application of load current on a generally instantaneous basis. In other words, as the load current increases to a given over-current level, the miniaturized control circuit deactivates the driver circuit. The deactivation of the driver circuit is essentially instantaneous.

As a further, adjunct object of the invention, the power switch used in the driver circuit for the electrical load is protected from high current flow. This is extremely beneficial in using a MOSFET or FET for the power switch of the driver circuit. By using the invention, the FET is generally indestructible from an overcurrent standpoint.

In accordance with still a further object of the present invention, there is provided a control circuit, as defined above, which control circuit is self-modulating in its pulse width so that full power is applied periodically to the monitored electrical load. During times of high current, the width or time during which full voltage is applied across the load is changed in accordance with the electrical characteristics of the load being monitored.

Still a further object of the present invention is the provision of a control circuit, as defined above, which control circuit employs a power switch, such as a MOSFET, that monitors both high currents and elevated temperatures at the FET.

Yet another object of the present invention is the provision of a control circuit for a power driver of the type used on a variety of D.C. loads, such as fan motors, air condition motors and light circuits, to name only a few.

Still a further object of the present invention is the provision of a control circuit, as defined above, which control circuit can be miniaturized and has a low cost. Consequently, the control circuit is useful in the high volumes required by the automobile industry.

Yet another object of the present invention is the provision of a control circuit, as defined above, which control circuit does not require a secondary current detector or a separate, secondary testing circuit.

Still a further object of the present invention is the provision of a control circuit, as defined above, which control circuit can be interchanged with existing control circuits for use on automobile fan driver circuits. The computer output demanding fan operation, which has a pulse width modulation according to fan need, can be sensed and used as an operating input for the control circuit constructed in accordance with the present invention.

Another object of the present invention is the provision of a control circuit, as defined above, which control circuit protects against over-currents, high temperature and short circuits.

These and other objects and advantages will become apparent from the following description taken together with the drawings described below.

BRIEF DESCRIPTION OF DRAWINGS

In this disclosure, the following drawings are discussed:

FIG. 3 is a chart illustrating in-rush current flow at the start of operation for the driver circuit;

FIG. 4 is a combined pulse diagram and voltage graph for a normal, soft start of the preferred embodiment of the present invention;

PREFERRED EMBODIMENT

Figure 1:
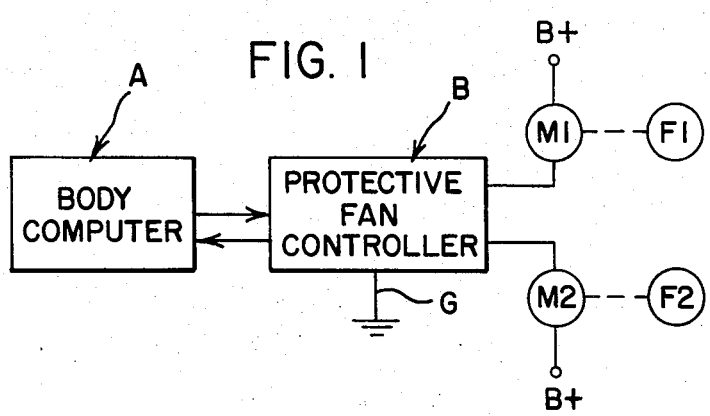
FIG. 1 is a combined block diagram and motor layout chart of the type employing the present invention.
Figure 2:
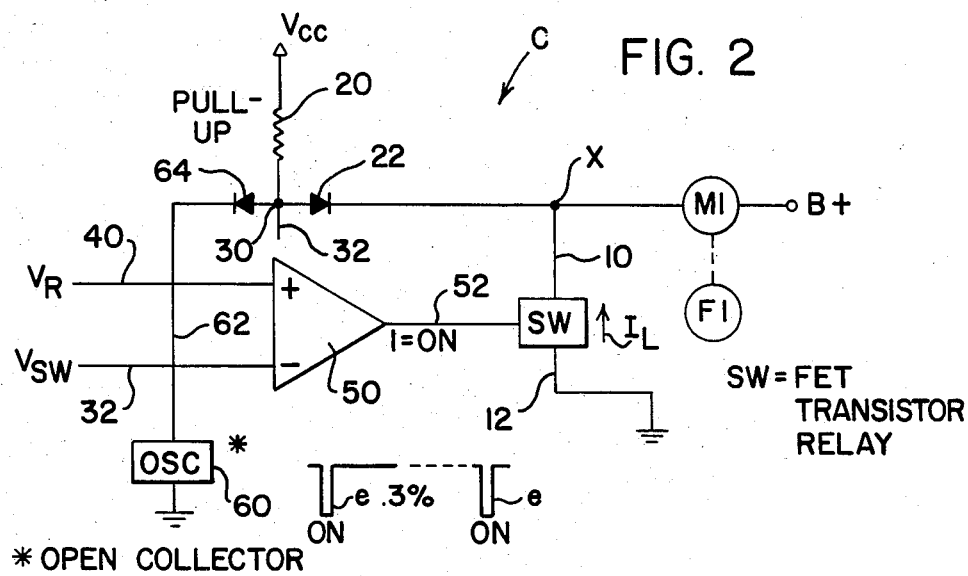
FIG. 2 is a schematic wiring diagram and an associated pulse chart showing the basic features of the present invention.

Referring now to the drawings wherein the showings are for the purpose of illustrating a preferred embodiment of the invention only, and not for the purposes of limiting same, FIG. 1 shows fans F1, F2 driven selectively by energizing D.C. motor M1 or D.C. motor M2. These D.C. motors are in an automobile wherein the normal battery voltage B+ is connected through motors M1, M2 to an appropriate ground G when the onboard or body computer A instructs protective fan controller B to operate one or more of the fans based upon the cooling requirements of the motor vehicle. According to the needs of the vehicle, either one fan is energized fully or both fans are energized fully. In practice the computer could generate a duty cycle modulated demand signal. When that concept is used, a decoding circuit causes operation of fans F1, F2 in accordance with the duty cycle modulated demand signal. The protective fan controller B includes a control circuit C forming the preferred embodiment of the present invention and schematically illustrated in FIG. 2. In this illustration, only fan F1 is shown; however, the operation of control circuit C for fan F1 is the same as the operation of the control circuit C for fan F2, as better illustrated in FIG. 8. FIG. 2 is schematic and is submitted as an illustration of the general concepts involved in the present invention. This description should be taken together with the showings of the wiring diagram of FIG. 8 to fully appreciate the preferred embodiment of the present invention.

Figure 2B:
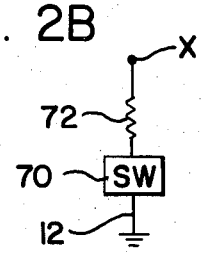
FIG. 2B is a partial wiring diagram of a modification for use in the circuit illustrated in FIG. 2.
Figure 8:
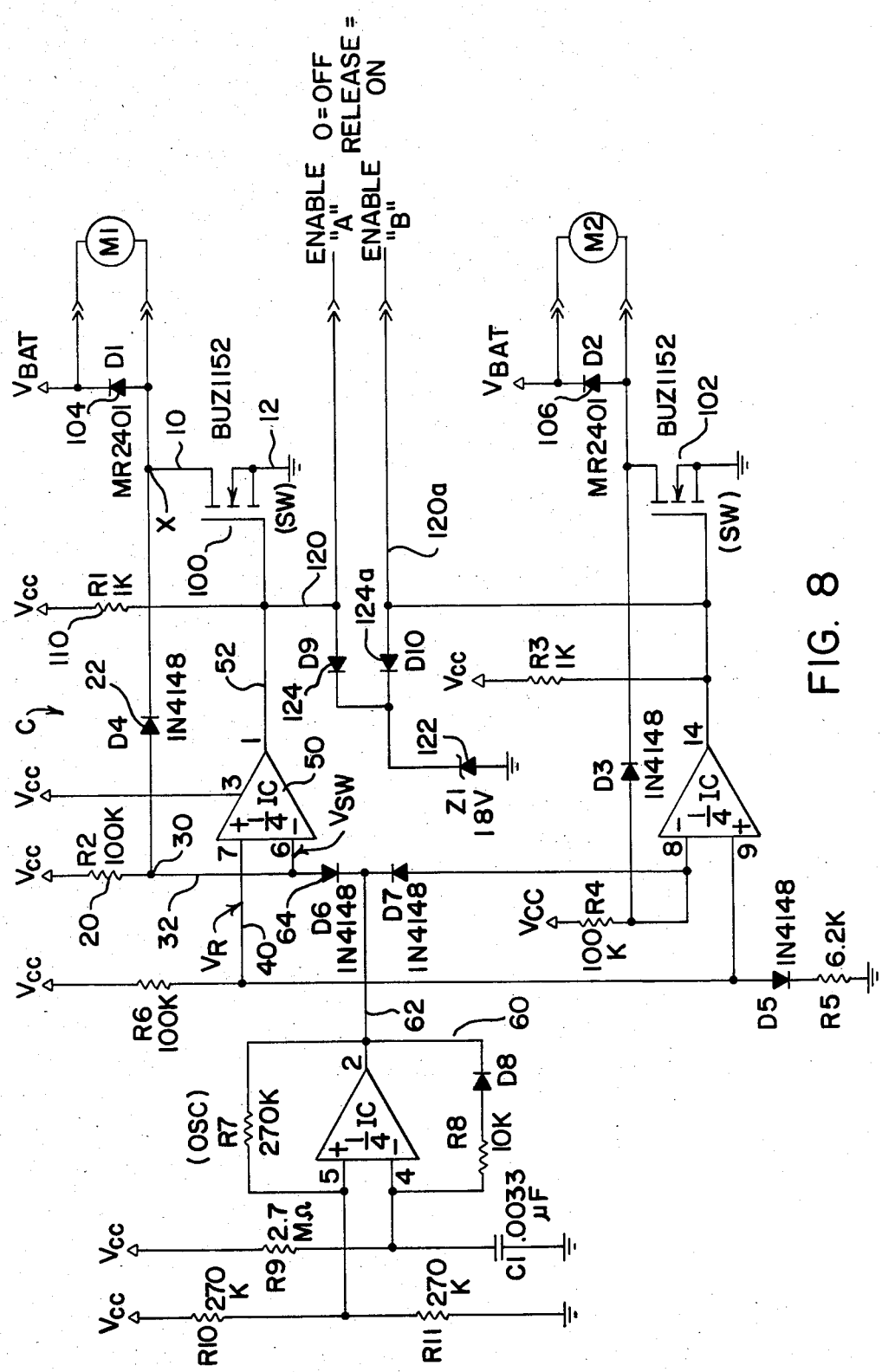
FIG. 8 is a wiring diagram showing the components employed in the commercial embodiment of the present invention; and, FIG. 9 is a simplified wiring diagram and logic chart illustrating the detecting circuit employed in the preferred embodiment of the present invention.

Power switch SW has an input 10 and a ground connection 12. In the preferred embodiment, input 10 is connected to the drain of the MOSFET. Junction or tap X is in a voltage divider formed by the resistance 20 connected through diode 22 to junction X and the resistance internally of switch SW. In FIG. 2B, switch 70 has an associated resistor 72 between ground 12 and junction X. This schematic representation of an associated resistor 72 is illustrative in nature showing that there is a certain amount of resistance across the switch SW from monitoring junction or tap X to ground 12. As so far described, the voltage of junction X controls the voltage of monitoring point 30 through diode 22. This monitoring point 30 is connected directly to a voltage monitoring line 32 which coacts with a reference line 40. Line 40 has a fixed, adjusted voltage and is connected to the positive terminal of comparator 50, in the form of an operational amplifier. The output 52 of comparator 50 produces or creates the control signal in the form of digital logic, wherein a logic 1 renders the switch SW conductive and a logic 0 renders the switch nonconductive. The current flowing through motor M1 when switch SW is conductive is represented as the arrow $I_L$. The magnitude of this current flow through the associated resistance of the switch SW produces a voltage at junction X. This voltage controls the voltage at the monitored point 30 connected by line 32 to the negative terminal of comparator 50 as shown in FIG. 8. The connection is schematically shown in FIG. 2 wherein an end of line 32 is depicted at point 30 and at comparator 50.

Figure 2A:
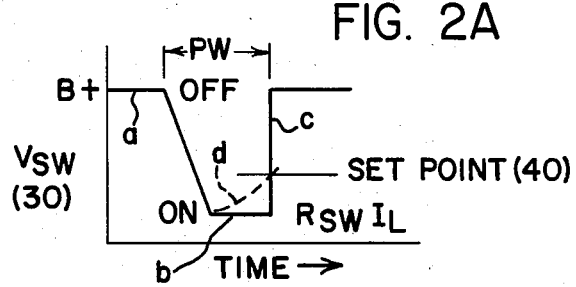
FIG. 2A is a pulse chart setting forth certain concepts to be used in describing the present invention.

The operation of circuit C, as so far described, can be understood by reference to FIG. 2A wherein voltage $V_{SW}$ at point 30 is plotted with respect to time. When switch SW is off, monitored point 30 is pulled near to the B+ voltage, as illustrated by portion a. Since this battery voltage is substantially higher than the reference voltage at line 40, switch SW is held nonconductive. Assuming that the switch is now turned on, the manner of doing this is irrelevant, full voltage B+ is connected across motor M1 by closing switch SW. Current $I_L$ flows through switch SW and its associated resistor which, in the case of a MOSFET, is the internal resistance of the MOSFET itself. The voltage $V_{SW}$ is then at the lower "ON" level shown as horizontal portion b. The dashed line d indicates that the switch SW has been turned on and load current $I_L$ is increasing as caused by a fault or starting current in-rush. When line d intersects the set point voltage at reference line 40, switch SW is turned off by using comparator 50; consequently, the voltage at monitored point 30 again shifts along vertical line c toward the B+ voltage level. With switch SW being turned off and on, point 30 oscillates between the "off" condition and the "on" condition. These conditions are shown as portions a and b. If the current stays below a given level determined by the voltage in line 40, switch SW remains on and operates along portion b. Assume that the current increases along the dashed line d until line d intersects the cut off or voltage set by voltage in line 40. Then the logic in line 52 shifts to a logic 0. This control signal immediately renders switch SW nonconductive by shifting switch SW to the "off" condition, i.e. along vertical line c in FIG. 2A.

In the past, switch SW was turned off and on by a duty cycle so that the pulse width PW, shown in FIG. 2A, was controlled externally according to the speed needed for motor M1. In such prior control circuit, there was no operation along line d. Indeed, the comparator 50 was not employed. The pulse width PW was modulated according to the desired power. This forced operation caused the difficulties previously mentioned in this disclosure. Current could destroy the FET before the FET was turned off.

In accordance with the present invention, comparator 50 is used and an arrangement is provided so that switch SW is not forced off to await a separate conduct or on signal. Switch SW remains conductive until an over-current is detected. The switch is then immediately turned off. The time that the switch is on is controlled by the load current and/or FET resistance. It is self-induced as to pulse width. In accordance with the invention, a series of pulses e are generated by oscillator 60 having an output 62 which is connected to the monitored point or junction 30 by diode 64. In practice, oscillator 60 operates at 1.1 KHz and pulses e have a duty cycle of approximately 0.3%. These energizing signals are at a logic 0 so that point 30 is pulled to a logic 0 when each successive, equally spaced pulse e is created. These energizing pulses are very narrow on a time base as indicated by the small duty cycle (0.3%) and they each pull diode 64 toward the ground. This pulling action is sufficient to create a logic 1 control signal, i.e. an "on" signal, in line 52 of comparator 50. Since the oscillator, as shown in FIG. 8, is an open collector circuit, during the time between pulses e point 30 is allowed to float. Consequently, point 30 assumes a level determined by the voltage at junction X. If line 52 is at a logic 1, pulse e has no effect on the comparator; however, should a logic 0 be in line 52 at a spaced energizing pulse e, line 52 shifts to a logic 1 and switch SW is turned on. This concept of using a train of pulses e to periodically activate switch SW is the preferred embodiment of the invention. Other arrangements could be used to periodically shift switch SW to operating line or portion b in FIG. 2A for control by the load current such as pulses at line 52.

In the commercial embodiment of the invention, as shown in FIG. 8, the switch for motor M1 is FET 100. In a like manner, a parallel operated FET 102 controls the second motor M2. Since both motors are operated substantially the same, description of the operation of FET 100 and its control over the driver circuit for motor M1 will apply equally to the control operation of FET 102. Flyback diodes 104, 106 are standard components in motor driver circuits of the type to which the present invention is specifically directed. Pull up resistor 110 is connected to control signal line 52 formed by the output of the comparator 50. The voltage on the gate of FET 100 is controlled either by the logic in line 52 or the voltage condition of an enable line 120. Line 120 is controlled, in turn, by the demand for cooling calculated by computer A as a signal in line "A", as shown in FIG. 8, for the motor M1 or line "B" for motor M2. If an enable signal, i.e. a logic 1 appears in line 120, the lower portion of resistor 110 is at a logic 1. When an "off" signal is applied to line "A", a logic 0 is applied to line 120. This reverse biases the gate of FET 100, irrespective of the logic on line 52. Thus, FET 100 is held in the off condition by a logic 0 in line 120. If the logic in line 120 is allowed to float, which is the "on" command for motor M, then the Zener diode 122 is connected to the lower portion of resistor 110 by diode 124. This allows line 52 to float in accordance with the output of comparator 50. Thus, when motor M1 is turned on by computer A, line 120 is released, i.e. allowed to float. To turn the motor off, a logic 0 is applied in line 120. In a like manner, enable line 120a controls the operation of motor M2 and is connected to the Zener diode 122 by diode 124a. The logic in lines 120, 120a, instructs one or more of the motors M1 to be fully on. During this condition, control circuit C is used to control the FET 100 as explained in connection with the illustration of FIG. 2.

Normal operation of control circuit C is graphically illustrated in FIGS. 3 and 4. When the logic in line 120 is released, a logic 1 is applied to line 52 by the pull-up resistor 100. When that occurs, FET 100 is forward biased and current starts to flow, as shown in FIG. 3. There is a normal in-rush of current $I_L$, as shown by the spike of current. Thereafter, there is a steady state current condition where current $I_L$ remains relatively constant. This in-rush current shown as a spike in FIG. 3 can damage FET 100 during normal operation of motor M1. The present invention allows the use of a FET which is protected against high current flow even during this normal current in-rush condition. This is a substantial advance in the art and allows a MOSFET to be used as a power switch in the control circuit, instead of a mechanical relay.

Referring to FIG. 4, the left hand portion of the graph illustrates the $V_{SW}$ voltage when FET 100 has been turned on. Voltage $V_{SW}$ shifts to the "on" value at point 202. Thereafter, a voltage pulse 200 is created at line 32 and point 30. This pulse has a starting point at point 202 and an increasing current (and voltage) portion 204. As the load current $I_L$ increases, the resistance of FET 100 causes the voltage $V_{SW}$ at point 30 to increase along voltage line 204. When this voltage, appearing at line 32, reaches set point 206, FET 100 is immediately turned off. It is rendered nonconductive. As soon as that occurs, the voltage at junction X is substantially the B+ voltage. FET 100 is off for the period determined by the length of the transverse or horizontal line 210. FET 100 will remain off until it has been turned on again by a signal in line 120 or, during the normal monitoring mode, by creation of one of the repetitive pulses e. When a pulse e occurs, the voltage of point 30 immediately shifts to the starting point 232 or "on" level of the next voltage pulse 230. The use of the term "pulse" for voltage portions 200, 230 should be explained. The space, i.e. time, between these two "pulses" is the time when the FET is on. Consequently, under normal terminology, a voltage pulse of energy is applied to motor M1 between pulse e at time 220 and the vertical line 238 of voltage pulses 230.

Referring now to voltage pulse 230, this pulse starts at the time 220, when an initiating signal or negative going pulse e occurs. Thereafter, increased current $I_L$ causes a voltage rise along line 234 from the starting voltage 232 to set point 236. For illustrative purposes, it is noticed that while line 234 is below point 236 a pulse e has no effect on comparator 50. FET 100 is conducting and there is no need to make the FET conductive by an energizing pulse e. When current flowing through FET 100 causes a voltage rise along line 234 to the set point 236, i.e. the same voltage as point 206, FET 100 is immediately turned off. This is illustrated by the vertical line 238. Again, FET 100 remains off, as illustrated by the horizontal length of line 240, until the next occurring pulse e.

As so far described, two power pulses P1 and P2 have been created as shown in FIG. 4. Pulses P1, P2, P3 of energy to motor M1 increase in width as current $I_L$ through the motor decreases as shown in FIG. 3. After pulse P3, FET 100 is turned on at time 246. By this time, current $I_L$ has reached the steady state condition shown in FIG. 3. The load current remains at the steady state voltage condition or level 248 which is the horizontal portion b of FIG. 2A. The pulse width of pulses P1, P2, P3, etc. changes according to the current conditions at any given time through the FET. This control action gives self-induced pulse width modulation.

Figure 5:
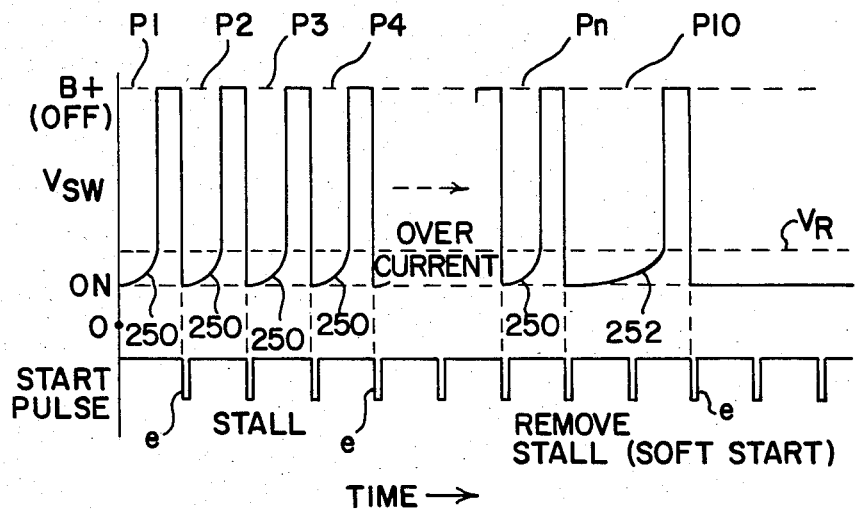
FIG. 5 is a pulse diagram and voltage graph, similar to FIG. 4, showing the stall condition of the motor driver circuit.

Referring now to FIG. 5, the same graph as illustrated in FIG. 4 is shown for the purposes of illustrating a stalled condition for motor M. When a stall occurs, a high current $I_L$ flows through FET 100. This produces the voltage rise curve 250 for junction or point 30. When this voltage curve intersects the set point, as controlled by the reference voltage, the FET is immediately turned off. The FET is then turned on at the next existing negative going pulse or energizing signal e. A stalled condition will create a series of pulses P1, P2, P3, P4 ... Pn. These voltage pulses are essentially the same and are the general mirror image of voltage applied to motor M1. They illustrate the current flow control over current through the motor and FET on an instantaneous basis. The current $I_L$ is limited to prevent damage to FET 100. Assume now that the stall of motor M1 has been corrected. This condition is illustrated in the right hand portion of FIG. 5. Curve 250 of the next voltage pulse becomes more gradual, as indicated in curve 252. Thus, pulse P10 has an increased width. This enlarging of the pulse width continues, as discussed with respect to the normal operation in FIG. 4, to start motor M1 for steady state operation.

Figure 6:
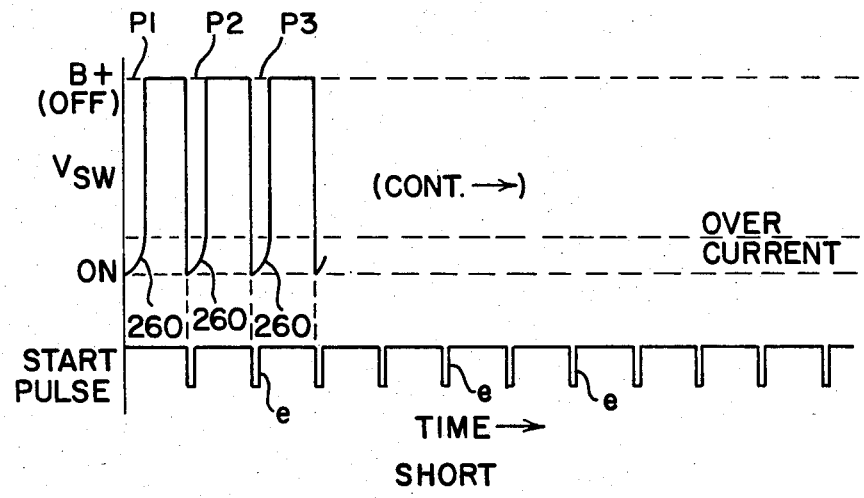
FIG. 6 is a further pulse diagram and voltage graph, similar to FIG. 4, illustrating operation during a short through the motor being monitored by the present invention.

When a short exists in the motor circuit, a tremendously high current $I_L$ flows as soon as FET 100 is conducting. Thus, a steep voltage increase occurs as represented by lines 260 as shown in FIG. 6. As soon as the FET is turned on, it is turned off. The curve 260 intersecting the voltage level for junction or point X as set in the control circuit C causes the turn off by the logic in line 52. When comparing the width of pulses P1, P2 and P3 in FIG. 6 with the corresponding pulses in FIG. 5, it is appreciated that the width of the pulses of energy through the motor circuit is controlled by the current flow through the circuit during stall and short conditions. This same principle applies during the starting sequence, as shown in FIG. 4. This feature of immediate turn off upon reaching a given current condition gives self-induced pulse width modulation controlled by operating parameters of the motor circuit.

Figure 7:
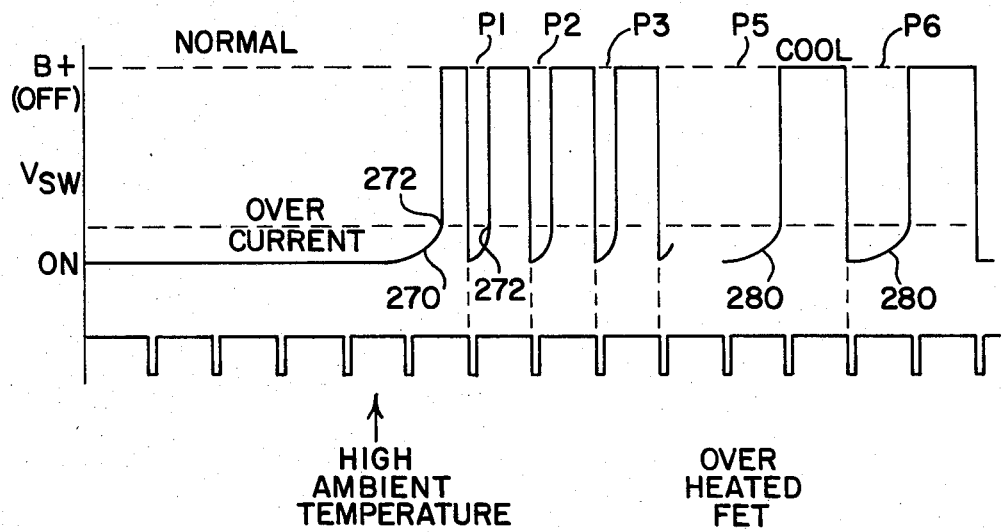
FIG. 7 is a combined pulse diagram and voltage graph, similar to FIG. 4, showing certain temperature operating characteristic obtainable by use of the present invention.

Assume that the resistance associated with switch SW, i.e. in the preferred embodiment the internal resistance of FET 100, increases because of ambient temperature increase. When that occurs, voltage of point 30 increases along line 270, as shown in FIG. 7. This line 270 intersects the reference voltage associated with junction or point 30 at point 272. The FET is then rendered non-conductive. Since the current rise is caused by an increase in the resistance level of the associated resistance of FET 100 and not by a change in an electrical characteristic of the motor circuit, the series of pulses P1, P2 and P3 are created having a relatively uniform width determined by the increased resistance of FET 100. In some instances, the over heated condition is at the FET itself and is not caused by some unusual ambient temperature situation. Thus, when the FET is rendered nonconductive, it cools. This reduces the resistance of the FET. This cooling of the FET while it is nonconductive is illustrated in the right hand portion of FIG. 7 where the increase in current causing the voltage lines 280 is more gradual. The FET heats up after it has been allowed to cool and is again energized. When the FET is turned off, it again cools down. This cooling and heating increases the time for reaching the set point so pulses P5, P6 are wider than pulses P1, P2, P3 in FIG. 7.

Figure 9:
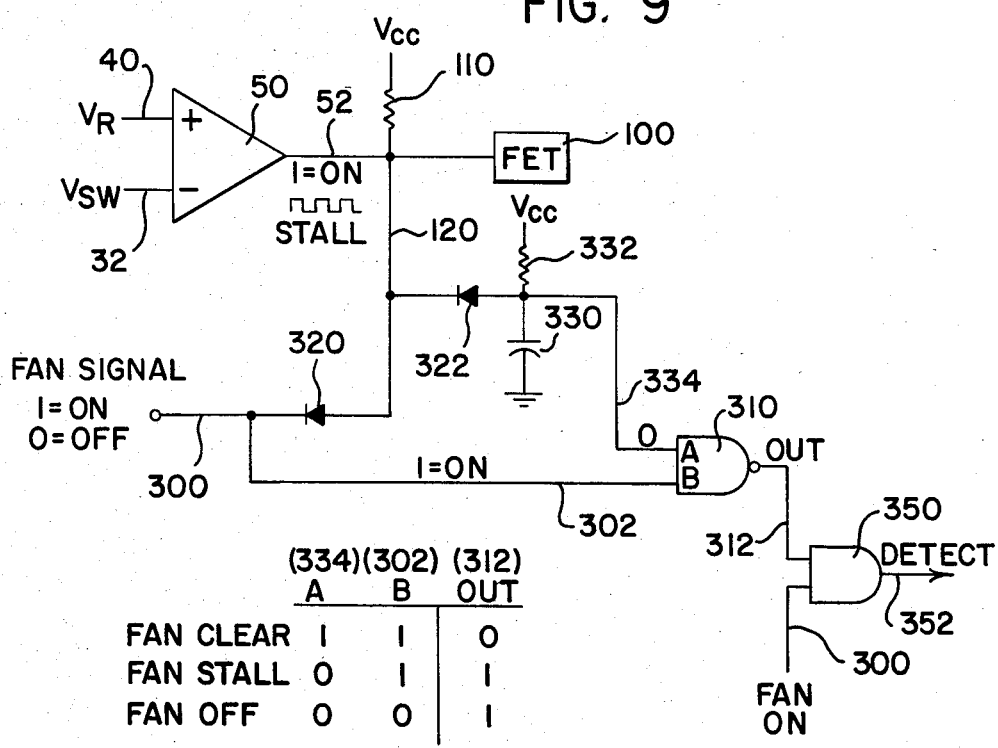

In FIG. 9, a schematically represented detecting circuit is illustrated. Main software and hardware detector concepts could be used, however, one is illustrated for an example. When a logic 0 is applied to line 52, FET 100 is locked in the nonconductive condition. The enable or disable line creating this blocking logic is illustrated as line 300. A logic 0 in this line applies a logic 0 through line 302 to one input of NAND gate 310. This gate has an output 312 which functions in accordance with the truth diagram shown at the bottom of FIG. 9. Line 120 is connected to the control line 300 by diode 320. In turn, diode 322 connects capacitor 330 with this same line 120. Capacitor 330 has a relatively high charging resistor 332 so that the capacitor charges slowly from the voltage supply $V_{cc}$. The voltage contained on capacitor 330 at any given time is directed through line 334 to the second input of NAND gate 310. When line 300 shifts from a logic 0 to a logic 1, line 120 turns FET 100 on. This is the "on" condition which is now the monitored condition. Line 120 is then released to release line 52 for control of FET 100. Assume that there is a stalled condition, the signal in line 52 will oscillate, since there are a series of negative control signals in line 52 turning FET 100 off as soon as the current $I_L$ reaches the set current. This pulsating condition in line 52 is detected in line 120 and causes discharge of capacitor 330. This capacitor discharge places a logic 0 on line 334 of gate 310. If line 334 is at a logic 0, there is a stall or short in the motor circuit or the fan is off. If the fan is off, a logic 0 appears in line 120 and the capacitor remains discharged. When the motor is operating properly line 52 and line 334 remain at a logic 1. Consequently, the logic in line 312 is a logic 1 during a stall or short condition. In addition a logic 1 will appear when the logic 0 on line 300 disables FET 100. These conditions can be distinguished by combining the logic in line 312 with the logic on line 300 to determine whether or not the motor has been requested to be in the "on" condition. This recognition function is performed in the computer A and is only schematically shown as an AND gate 350 with inputs 300, 312 and an output or detect line 352. The software of the computer detects the condition of line 312 and the commands to the fan M1 for the purpose of determining whether or not there is a stall or short, i.e. "fault" condition. This fact is directed to the operator for appropriate corrective action.

Having thus defined the invention, the folowing is claimed:

1. A control circuit for operating a power switch with an associated resistance, said power switch having nonconductive and conductive conditions and adapted to apply a driving voltage across an electrical load circuit when said power switch is in its conductive condition, said control circuit comprising: means for creating a variable monitored signal corresponding to the generally instantaneous voltage across said power switch and associated resistance; means for creating a fixed reference signal; means for creating a control signal having a preselected electrical characteristic when said monitored signal has a given relationship with said reference signal; first means for shifting said power switch from the conductive condition to the nonconductive condition upon creation of said control signal; and, second means for periodically creating an energizing signal in the form of pulses shifting said power switch into said conductive condition when it is in said nonconductive condition.

2. A control circuit as defined in claim 1 further including means for selectively holding said power switch in said nonconductive condition irrespective of said energizing signal.

3. A control circuit as defined in claim 2 wherein said holding means is a computer generated signal indicative of selective deactivation of said electrical load circuit.

4. A control circuit as defined in claim 1 wherein said power switch is a FET.

5. A control circuit as defined in claim 4 wherein said associated resistance is the conducting resistance of said FET.

6. A control circuit as defined in claim 1 wherein said power switch is a transistor.

7. A control circuit as defined in claim 1 wherein said monitored signal creating means is a voltage sinkable junction in a voltage divider including a fixed resistor between said junction and a generally fixed voltage source and said power switch and associated resistance between said junction and a generally fixed ground.

8. A control circuit as defined in claim 1 wherein said electrical load circuit is a D.C. motor.

9. A control circuit as defined in claim 8 wherein said driving voltage is a D.C. battery voltage.

10. A control circuit as defined in claim 1 wherein said control signal creating means is a solid state comparator and said control signal is the signal on the output of said comparator.

11. A control circuit as defined in claim 10 wherein said electrical characteristic is a voltage level.

12. A control circuit as defined in claim 10 wherein said given relationship is where said monitored signal is less than said reference signal.

13. A control circuit as defined in claim 12 wherein said first shifting means includes means for rendering said power switch nonconductive when said monitored signal is less than said reference signal.

14. A control circuit as defined in claim 13 wherein said second means includes pulsing means for periodically pulling said monitored signal to a level less than said reference signal by creation of said energizing signal.

15. A control circuit as defined in claim 14 wherein said pulsing means is an oscillator periodically creating said energizing signals as a series of pulses.

16. A control circuit as defined in claim 15 wherein said periodic series of pulses has a small duty cycle.

17. A control circuit as defined in claim 16 wherein said duty cycle is about 0.3%.

18. A control circuit as defined in claim 16 wherein said series of pulses has a frequency of about 1.1 KHz.

19. A control circuit as defined in claim 1 wherein said given relationship is where said monitored signal is less than said reference signal.

20. A control circuit as defined in claim 19 wherein said first shifting means includes means for rendering said power switch nonconductive when said monitored signal is less than said reference signal.

21. A control circuit as defined in claim 20 wherein said second means includes pulsing means for periodically pulling said monitored signal to a level less than said reference signal by creation of said energizing signal.

22. A control circuit as defined in claim 21 wherein said pulsing means is an oscillator periodically creating said energizing signals as a series of pulses.

23. A control circuit as defined in claim 1 wherein said first shifting means includes means for rendering said power switch nonconductive when said monitored signal is less than said reference signal.

24. A control circuit as defined in claim 1 wherein said second means includes pulsing means for periodically pulling said monitored signal to a level less than said reference signal by creation of said energizing signal.

25. A control circuit as defined in claim 24 wherein said pulsing means is an oscillator periodically creating said energizing signals as a series of pulses.

26. A control circuit as defined in claim 25 wherein said periodic series of pulses has a small duty cycle.

27. A control circuit as defined in claim 2 including means for detecting a series of said control signals and means for creating a detect signal upon actuation of said detecting means.

28. A control circuit as defined in claim 27 wherein said detecting means includes a capacitor discharged by existence of a control signal and charged during non-existence of a control signal and said creating means including means for creating said detect signal when said capacitor is discharged to a given level and holding means is not actuated.

29. A method of operating a power switch with an associated resistance, said power switch having nonconductive and conductive conditions and adapted to apply a driving voltage across an electrical load circuit when said power switch is in its conductive condition, said method comprising the steps of:
 (a) rendering said power switch conductive;
 (b) measuring the voltage across said power switch and associated resistance;
 (c) shifting said power switch to the nonconductive condition when said measured voltage exceeds a preselected value; and,
 (d) creating a series of energizing pulses having a low duty cycle and a high frequency which pulses will render said power switch conductive when it is nonconductive.

30. A method as defined in claim 29 including the additional step of selectively holding said power switch in said nonconductive condition.

* * * * *